United States Patent [19]

Okabe et al.

[11] 4,152,296

[45] May 1, 1979

[54] PROCESS FOR PREPARING CATALYSTS FOR REMOVAL OF NITROGEN OXIDES

[75] Inventors: Thoru Okabe, Hyogo; Saburo Hayashi, Kakogawa, both of Japan

[73] Assignee: Seitetsu Kagaku Co., Ltd., Japan

[21] Appl. No.: 865,802

[22] Filed: Dec. 30, 1977

[30] Foreign Application Priority Data

Sep. 30, 1977 [JP] Japan .................................. 52/118138

[51] Int. Cl.$^2$ ........................ B01J 27/02; B01J 21/00; C01B 17/20
[52] U.S. Cl. ................................... 252/440; 252/461; 423/230
[58] Field of Search ............................. 252/440, 461

[56] References Cited

U.S. PATENT DOCUMENTS

| | | | |
|---|---|---|---|
| 2,081,272 | 5/1937 | Foster | 252/440 X |
| 3,480,565 | 11/1969 | Adams | 252/440 X |
| 3,799,888 | 3/1974 | Suvorov et al. | 252/461 X |
| 3,917,682 | 11/1975 | Mizukami et al. | 252/461 X |
| 4,036,783 | 7/1977 | Blechschmitt et al. | 252/461 |
| 4,048,112 | 9/1977 | Matsushita et al. | 252/461 |

FOREIGN PATENT DOCUMENTS 122473 1974 Japan.
128680 1975 Japan.

*Primary Examiner*—Delbert E. Gantz
*Assistant Examiner*—William G. Wright
*Attorney, Agent, or Firm*—Pollock, Vande Sande & Priddy

[57] ABSTRACT

A catalyst for removal of nitrogen oxides which shows extremely good catalytic activity and is excellent in durability and is low in the activity of oxidizing $SO_2$ into $SO_3$ be prepared at a low cost by impregnating a titanium oxide carrier with a vanadium sulfate, a vanadyl sulfate or a mixture thereof and then reacting a mixed gas consisting of 0.05 to 100% by mole of ammonia and 99.95 to 0% by mole of an inert gas which is inert to both ammonia and vanadium and vanadyl sulfates with the impregnated carrier while the reaction mixture is maintained at a temperature of 300° to 520° C., and preferably 370° to 450° C., or by shaping a mixture of titanium oxide and a vanadium sulfate, a vanadyl sulfate or a mixture thereof into a desired shape and then reacting a mixed gas consisting of 0.05 to 100% by mole of ammonia and 99.95 to 0% by mole of an inert gas which is inert to both ammonia and vanadium and vanadyl sulfates with the shaped mixture while the reaction mixture is maintained at a temperature of 300° to 520° C., and preferably 370° to 450° C.

20 Claims, 1 Drawing Figure

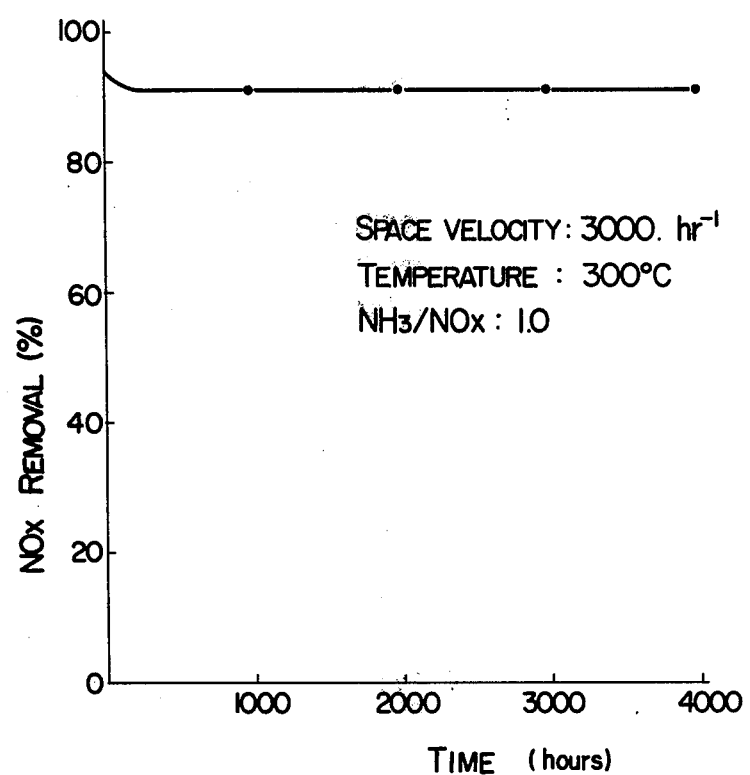

PROCESS FOR PREPARING CATALYSTS FOR REMOVAL OF NITROGEN OXIDES

The present invention relates to a process for preparing catalysts for removal of nitrogen oxides. More particularly, the invention pertains to a process for preparing catalysts for removal of nitrogen oxides which comprises reacting a mixed gas consisting of ammonia and an inert gas which is inert to both ammonia and vanadium and vanadyl sulfates (hereinafter referred to as "ammonia-containing gas") with a titanium oxide carrier impregnated with a vanadium sulfate, a vanadyl sulfate or a mixture thereof or reacting said ammonia-containing gas with a mixture of titanium oxide and a vanadium sulfate, a vanadyl sulfate or a mixture thereof shaped into a desired shape.

Metal oxide-containing catalysts have heretofore been used in various catalytic reactions. Recently, these removing nitrogen oxides (hereinafter referred to as "$NO_x$") contained in various waste gases. A process which comprises contacting $NO_x$ contained in a waste gas with a metal oxide catalyst in the presence of ammonia gas to reduce $NO_x$ into harmless nitrogen and water is commercially advantageous and has been used exclusively as a process for removal of $NO_x$.

As a catalyst used in such a case, various catalysts have been proposed. As described in Japanese Patent Kokai (Laid-Open) No. 122,473/74 or Japanese Patent Kokai (Laid-Open) No. 128,680/75, catalysts comprising titanium oxide and a vanadium oxide show comparatively high catalytic activity and is excellent in durability in waste gases among such catalysts. These catalysts are prepared by mixing a solution of ammonium metavanadate in a solvent with titanium tetrachloride, impregnating activated alumina with the resulting mixture, and then drying the alumina thus impregnated. The catalysts obtained by said processes give substantially satisfactory results in durability and catalytic activity, but the catalysts can not be satisfactory. The vanadium-containing catalysts are expensive. Also, industrial waste gases often contain $SO_2$ and $O_2$. The $SO_2$ is oxidized into $SO_3$ by the activity of said catalysts for removal of $NO_x$. As the $SO_3$ concentration in the waste gases increases, therefore, the active centers of the catalysts are lost and the activity of the catalysts decreases. Further, the increase in the $SO_3$ concentration causes corrosion of equipments such as heat exchangers. On the other hand, ammonium sulfate and ammonium bisulfate are produced by a reaction of said $SO_3$ with unreacted ammonia. The ammonium bisulfate are accumulated in the apparatus, resulting in the blockage of the paths in the apparatus which prevents smooth operation.

As an industrially excellent catalyst for removal of $NO_x$, therefore, the advent of an inexpensive catalyst having high catalytic activity, excellent durability and low activity of oxidizing $SO_2$ into $SO_3$ has been desired.

Therefore, an object of the present invention is to provide a process for preparing catalysts for removal of $NO_x$ in which the above-mentioned defects of prior art catalysts for removal of $NO_x$ have been obviated.

Another object of the invention is to provide a process for preparing catalysts for removal of $NO_x$ having high catalytic activity and excellent durability at a low cost with less operational trouble.

The other objects and advantages of the present invention will be apparent from the following description and claims, taken in conjunction with the accompanying drawing which shows a relationship between $NO_x$ removal % and time.

In order to obviate the above-mentioned defects of prior art catalysts for removal of $NO_x$, the present inventors made an extensive study on the preparation of a catalyst for reduction of $NO_x$, and particularly NO and $NO_2$, to search for a catalyst having higher catalytic activity and excellent durability as compared with prior art catalysts and which does not increase the conentration of $SO_3$ produced by oxidation of $SO_2$. As a result, processes for preparing catalyst which gives satisfactory results only under the specific conditions as described below have now been found.

According to the present invention, there are provided a process for preparing a catalyst for removal of nitrogen oxides which comprises impregnating a titanium oxide carrier with at least one vanadium compound selected from the group consisting of vanadium sulfates, vanadyl sulfates and a mixture thereof and then reacting a mixed gas consisting of 0.05 to 100% by mole of ammonia and 99.95 to 0% by mole of an inert gas which is substantially inert to both ammonia and vanadium and vanadyl sulfates with the impregnated carrier while the reaction mixture is maintained at a temperature of 300° to 520° C., and a process for preparing a catalyst for removal of nitrogen oxides which comprises shaping a mixture of titanium oxide and at least one vanadium compound selected from the group consisting of vanadium sulfates, vanadyl sulfates and a mixture thereof into a desired shape and then reacting a mixed gas consisting of 0.05 to 100% by mole of ammonia and 99.95 to 0% by mole of an inert gas which is substantially inert to both ammonia and vanadium and vanadyl sulfates with the shaped mixture while the reaction mixture is maintained at a temperature of 300° to 520° C.

The catalysts obtained according to the process of the present invention show very good catalytic activity, are excellent in durability, and are less in the amount of $SO_2$ oxidized into $SO_3$. Thus, the defects fo prior art catalysts have been completely obviated. Further, the amount of vanadium supported as an active ingredient of a catalyst can be small. Therefore, it is a great advantage of the process of the present invention that catalysts for removal of $NO_x$ can be prepared at a lower cost as compared with prior art vanadium catalysts.

Titanium oxide as a catalyst carrier may be one obtained by shaping powdery titanium oxide according to a usual method. Titanium oxide of any shape such as honeycomb-form, pellet-form, ring-form, etc. may be used. Also, it is possible to mix titanium oxide powder itself with a vanadium sulfate, a vanadyl sulfate or a mixture thereof and then shape the resulting mixture.

As a vanadium compound to be supported by or mixed with titanium oxide, any one of V or VO compounds in the form of sulfate may be used. For example, vanadium (II) sulfate ($VSO_4$), vanadium (III) sulfate [$V_2(SO_4)_3$], vanadyl sulfates ($VOSO_4$), [$(VO)_2(SO_4)$], and [$V_2O_2)(SO_4)_2$], etc. and a mixture thereof may be used. The amount thereof supported is 0.1 to 5% by weight, and preferably 0.35 to 1.35% by weight, as vanadium atom based on the weight of the carrier. If the amount is less than 0.1% by weight, the $NO_x$ removal % obtained is low. Also if the amount is more than 5% by weight, no additional effect can be obtained, but, according to experimental results on a relationship between vanadium content and $NO_x$ removal %, the temperature at which the same $NO_x$ removal % can be obtained rather increases. It is a large difference between the catalysts of the present invention and previously known vanadium catalysts that the use of a large amount of expensive vanadium is thus not required in the catalysts of the present invention. It is a large advantage that the amount of vanadium in the cataysts of the present invention can be rather small.

The impregnation of a carrier of shaped titanium oxide with a vanadium sulfate, a vanadyl sulfate or a mixture thereof may be carried out according to a usual method. For example, an appointed amount of a vanadium sulfate, a vanadyl sulfate or a mixture thereof is dissolved in water to form a uniform solution. A carrier of shaped titanium oxide is dipped in the solution, and the solution is then boiled by heating. Thus, the carrier can be impregnated uniformly with the solution in a short period of time. Also, a mixture of powdery titanium oxide and a vanadium sulfate, a vanadyl sulfate or a mixture thereof is moderately moistened, and if necessary, added with a binder such as polyvinyl alcohol, and then shaped by a conventional catalyst shaping machine into a desired shape such as a globular form, a cylindrical form, a ring-form, etc.

Thus, the carrier is saturated with a solution, and the carrier is then recovered from the solution. Moisture contained in pores is evaporated to dry the carrier. The carrier is maintained at an appointed temperature and the treated with said ammonia-containing gas. The ammonia-containing gas used herein consists of 0.05 to 100% by mole of ammonia and 99.95 to 0% by mole of an inert gas which is substantially inert to both ammonia and vanadium and vanadyl sulfates. Thus, the catalysts of the present invention can be obtained.

Also, when a mixture of powdery titanium oxide and a vanadium sulfate, a vanadyl sulfate or a mixture thereof is shaped into a desired shape, maintained at an appointed temperature and then treated with said ammonia-containing gas, a similar result an be obtained. The ammonia-containing gas used in the treatment of the shaped product contains 0.05 to 100% by mole of ammonia and if necessary, is diluted with gases substantially inert to both ammonia and vanadium and vanadyl sulfates such as nitrogen, helium, argon, stream, carbon dioxide, etc. Of course, it is possible to use ammonia gas containing no inert gas as the case may be. It is usually commercially advantageous to use nitrogen or steam as a diluent gas. If the ammonia concentration is lower than 0.05% by mole, a long period of time is required for the preparation of catalysts. Also, if the ammonia concentration is high and simultaneously the charging rate of ammonia is high, the reaction proceeds suddenly and thereby cracks are produced in the shaped product owing to thermal stress caused by heat of reaction.

The preparation of catalysts in the present invention is carried out by charging a shaped product containing a vanadium sulfate, a vanadyl sulfate or a mixture thereof into an ammonia treating apparatus and then circulating an ammonia-containing gas through the apparatus.

Here, the treatment temperature is 300° to 520°C., and preferably 370° to 450° C. If the treatment temperature is too low, the reaction rate is lowered and the catalyst preparation reaction comes to substantially not proceed. Also, if the treatment temperature is too high, the reaction rate remarkably increases. As a result, not only cracks become easy to be produced in the shaped product as described above, but also the temperature approaches to the decomposition temperature of ammonia and there is the possibility that part of ammonia is decomposed and consumed. Further, it is not preferable in that thermal degradation may be caused by sintering of the carrier due to the high temperature. On the preparation of catalysts, the ammonia concentration decreases gradually since the ammonia circulated is consumed by reaction with the vanadium sulfate, vanadyl sulfate or a mixture thereof. Therefore, it is desirable to supplement the ammonia-containing gas suitably to maintain the ammonia concentration in said reactor at at least 0.05% by mole.

The catalysts produced according to the process of the present invention have a pore volume of 0.30 to 0.45 ml/g and a specific surface are of 20 to 50 m²/g.

It is considered that, for example, vanadyl sulfate ($VOSO_4$) or vanadium (II) sulfate ($VSO_4$) which has permeated onto the surface of pores in a catalyst is subjected to addition reaction with titanium oxide as a carrier to form $(TiO_2)_n \cdot VOSO_4$ or $(TiO_2)_n \cdot VSO_4$, which are then reacted with ammonia to form $(TiO_2)_n \cdot VO_2$ or $TiO_2)_n \cdot VO$ as shown by the following reaction formulae:

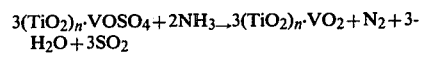

$3(TiO_2)_n \cdot VOSO_4 + 2NH_3 \rightarrow 3(TiO_2)_n \cdot VO_2 + N_2 + 3H_2O + 3SO_2$

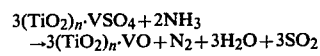

$3(TiO_2)_n \cdot VSO_4 + 2NH_3 \rightarrow 3(TiO_2)_n \cdot VO + N_2 + 3H_2O + 3SO_2$ The catalysts thus prepared show outstanding characteristics in a catalytic reaction of removal of $NO_x$. The catalysts are characterized in that less active centers are lost owing to a very low extent of oxidation of $SO_2$ into $SO_3$ and a reducing gas is selectively reacted with $NO_x$ for a long period of time.

Reductive removal of $NO_x$ with the catalysts of the present invention is applicable to all reducing gases such as hydrogen, hydrocarbons, carbon monoxide, ammonia, etc. In the treatment of flue waste gas, a remarkable effect is produced when ammonia is used as a reducing agent.

Previously known catalysts containing platinum or copper as an active ingredient show strong oxidation activity toward ammonia, and contrariwise ammonia is converted into $NO_x$ at high temperatures. As a result, not only an $NO_x$ removal percentage reduces suddenly, but also the catalysts are poisoned by $SO_2$ and $SO_3$ contained in the waste gas and their catalytic activity reduces with the lapse of time. Therefore, the temperature and $SO_x$ concentration of the waste gas are limited and a field of practical use of the catalysts is limited.

On the other hand, the catalysts of the present invention show a selectively reducing activity toward $NO_x$. Therefore, the catalysts are applicable to a wide range of the temperature and $SO_x$ concentration of a waste gas.

When $NO_x$ in a waste gas is removed by reducing it with the catalysts of the present invention, $NO_x$ in the waste gas can be decomposed and removed at a removal percentage of nearly 100% by treating at a temperature of 200° to 500° C., and at a temperature of 250° 350° C. as the case may be, since the catalytic activity of the catalysts at lower temperatures is higher as compared with prior art catalysts. The unreacted ammonia in the exit gas can be minimized. It is advantageous from viewpoints of apparatus, safety and economy that such an operation at low temperatures can be carried out.

Even if the catalysts are used at an $SO_2$ concentration of a waste gas as high as 2000 ppm, the $SO_3$ concentration of the waste gas does not increase since the catalysts have a very low activity of oxidizing $SO_2$ into $SO_3$. Also, the catalysts can maintain a stable catalytic activity for a long period of time since ammonium sulfate and ammonium bisulfate are substantially not deposited in the pores of the catalysts.

When $NO_x$ in a waste gas is removed by reductive decomposition with ammonia at a temperature of lower than the decomposition temperature of ammonium bisulfate, for example, at a temperature of 250 to 350° C. in the presence of prior art catalysts, ammonium sulfate and ammonium bisulfate are produced in the pores of the catalysts from $SO_3$ produced by oxidation of $SO_2$, ammonia as a reducing agent and water vapor with the lapse of time, and the catalytic activity of the catalysts is remarkably reduced. Therefore, a means for recovering the catalytic activity of the catalysts had to be taken by increasing the temperature to a temperature of higher than the decomposition temperature of ammonium bisulfate intermittently to decompose the accumulated ammonium bisulfate. On the other hand, in the case of the catalysts of the present invention, the amount of ammonium sulfate and ammonium bisulfate accumulated is very small and the system reaches its equilibrium state when a certain small amount of the sulfates have been accumulated and the amount of the sulfates accumulated does no more increase. Therefore, the catalytic activity of the catalysts does not change in a worse direction with the lapse of time. Although the reasons therefor are not enough clear, it is presumed that ammonium sulfate or ammonium bisulfate formed in the catalysts are very unstable and are decomposed into $N_2$, $SO_3$ and $H_2O$ by reaction with $NO_x$ in the waste gas.

When $SO_3$ exists in the waste gas, an equilibrium value for the amount of ammonium sulfate and ammonium bisulfate accumulated in the catalysts increases in proportion to the $SO_3$ concentration. At an $SO_3$ concentration of about 100 ppm or less which is encountered with usual waste gases, however, an $NO_x$ removal percentage merely slightly decreases in the early stages and does no more decrease even if time proceeds. This is one of the characteristics of the present invention.

The following examples and comparative examples illustrate the present invention in more detail.

EXAMPLE 1

In a solution of 16.6 g of vanadyl sulfate ($VOSO_4 \cdot 3H_2O$) in 185 g of water was dipped 300g of a titanium oxide ($TiO_2$) carrier in the form of tablet of 5-6 mm in diameter (trademark CS-246 manufactured by Sakai Kagaku Co, Ltd., specific surface area 30 $m^2/g$, pore volume 0.32 ml/g), and the solution was boiled for 5 minutes and then cooled.

When the carrier was recovered from the aqueous solution, the carrier had a weight of 411.4 g. When the carrier was then dried at 300° C. for 3 hours, its weight became 307 g.

The vanadium sulfate carried on titanium oxide carrier as thus prepared was packed into a quartz reaction tube of 25 mm in diameter, and was then treated for 3 hours by flowing nitrogen gas containing 20% by mole of ammonia through the reaction tube while the reaction tube was heated to 400° C. by an electric furnace. Thus, the weight of the carrier became 30.5 g.

The catalyst thus obtained contained 0.72 g of vanadium atom per 100 g of a titanium oxide carrier and had a specific surface area of 29.8 $m^3/g$.

The following $NO_x$ removal reaction was carried out by the use of this catalyst:

Into a quartz reaction tube of 25 mm in diameter was packed 39 ml of the catalyst at a packed length of 80 mm. The reaction tube was heated to 400° C. by an electric furnace. A gas having the composition as described below was passed through this catalyst zone at a space velocity (NTP basis, based on the volume of the empty reactor, hereinafter referred to as "SV") of 10,000 $hr^{-1}$. The $NO_x$ removal % (1 $-(NO_x$ remained/$NO_x$ charged $\times 100$) values obtained by varying the reaction temperature successively are shown in Table 1.

The amount of $NO_x$ was measured by an $NO_x$ measuring apparatus manufactured by Denki Kagaku Keiki Co., Ltd.

Table

| | Gas composition | | | | | | |
|---|---|---|---|---|---|---|---|
| Component | NO | $NH_3$ | $SO_2$ | $O_2$ | $CO_2$ | $H_2O$ | $N_2$ |
| Content | 400 ppm | 480 ppm | 300 ppm | 5% | 12% | 10% | Balance |

EXAMPLE 2

$NO_x$ removal reaction was carried out under the same conditions as in Example 1 by the use of a catalyst prepared in the same manner as in Example 1 except that 20.9 g of vanadium (II) sulfate ($VSO_4 \cdot 7H_2O$) was used in place of 16.6 g of vanadyl sulfate. The results obtained are shown in Table 1.

EXAMPLE 3

In 500 ml of an aqueous vanadyl sulfate solution prepared in the same manner as in Example 1 was suspended 100 g of powdery titanium oxide (trademark TCA-888, manufactured by Tohoku Kagaku Kogyo Co., Ltd.) and the suspended titanium oxide was then filtered by suction until the amount of the aqueous solution became 37% by weight based on the weight of titanium oxide. Thereafter, 20 ml of an 8% aqueous solution of polyvinyl alcohol as a binder was added, and the mixture was dried at 50° to 70° C. with stirring. The resulting powder was granulated, and the granules were sieved to adjust their size to from 32 to 42 mesh and then shaped into tablets having a diameter of 6 mm and a height of 26 mm by a tablet machine. The shaped product was burned at 450° C. for 2 hours, and was then treated by heating it for 3 hours while nitrogen gas containing 40% by mole of ammonia was passed. By the use of the thus obtain catalysts, $NO_x$ removal reaction was carried out under the same conditions as in Example 1. The results obtained are shown in Table 1.

EXAMPLE 4

$NO_x$ removal reaction was carried out under the same conditions as in Example 1 by the use of a catalyst prepared in the same manner as in Example 3 except that an aqueous vanadium sulfate solution prepared in the same manner as in Example 2 was used and that nitrogen gas containing 60% by mole of ammonia was used. The results obtained are shown in Table 1.

COMPARATIVE EXAMPLE 1

NO$_x$ removal reaction was carried out under the same conditions as in Exmaple 1 by the use of a catalyst prepared in the same manner as in Example 3 except that a solution obtained by dissolving 21.6 g of ammonium metavanadate in 478 g of water with heating was used as a vanadium raw material. The results obtained are shown in Table 1.

EXAMPLE 5

In an aqueous solution of 9 kg of vanadyl sulfate (VOSO$_4$·3H$_2$O) in 91 liters of water was dipped 25 kg of a ring-form shaped product of titanium oxide having an inside diameter of 15 mm, an outside diameter of 35 mm and height of 15 mm (manufactured by Sakai Kagaku Co., Ltd., a specific surface area 26 m$^2$/g, a pore volume 0.35 ml/g). The solution was then boiled for 10 minutes and cooled. After 10 hours, the shaped product was recovered from the aqueous solution and dried at room temperature for 3 days. The dried shaped product was packed in an ammonia treating apparatus having an inside diameter of 300 mm, a height of 500 mm, an inlet for charging ammonia and an outlet for removing the gas produced. The inside of the apparatus was replaced by nitrogen, and the shaped product was treated for 3 hours by introducing ammonia gas at a rate of 1 l/min. at a temperature of 400° to 420° C. while the apparatus was heated by an electric furnace and 1 m$^3$/min of nitrogen gas was recycled by a blower.

After the treatment, the resulting catalyst contained 0.68 of vanadium atom per 100 g of titanium oxide.

The catalyst was packed into a mild steel NO$_x$ removal reaction column having an inside diameter of 300 mm and a height of 4 m. The waste gas from a boiler using bunker A oil was passed through the column and NO$_x$ removal reaction was carried out under various conditions. The results obtained are shown in Table 2. Also, a relationship between NO$_x$ removal (%) and time is shown in the accompanying drawing.

EXAMPLES 6–9

Ring-form catalysts obtained by treating in the same manner as in Example 5 except that the concentration of vanadyl sulfate in the aqueous solution was varied and the catalyst as prepared in Example 5 were pulverized to a size of 10 to 20 mesh, and NO$_x$ removal reaction was carried out by the use of the catalysts under the same conditions as in Example 1. The results obtained are shown in Table 3. It is seen from Table 3 that the catalysts of the present invention show excellent catalytic activity at low temperatures even if their vanadium content is low.

COMPARATIVE EXAMPLE 2

By the use of a ring-form catalyst prepared in the same manner as in Example 5 except that titanium oxide was not impregnated with vanadyl sulfate, NO$_x$ removal reaction was carried out the same manner as in Examples 6–9. The results obtained are shown in Table 3.

Table 1

| Temp. Example | NO$_x$ removal (%) | | | | | |
|---|---|---|---|---|---|---|
| | 200° C. | 250° C. | 300° C. | 350° C. | 400° C. | 450° C. |
| 1 | 85.6 | 96.6 | 99.5 | 99.8 | 100 | 100 |
| 2 | 82.3 | 94.5 | 98.0 | 99.3 | 99.8 | 100 |
| 3 | 84.2 | 95.1 | 98.5 | 99.6 | 100 | 100 |
| 4 | 81.5 | 92.5 | 97.5 | 99.2 | 99.7 | 100 |
| Comparative Example 1 | 3.0 | 9.2 | 30.2 | 75.0 | 85.2 | 82.0 |

Table 2

| Ex. | Waste gas composition (Balance N$_2$) | | | | | | | NH$_3$ charged ppm | SV (hr$^{-1}$) | Reaction temperature (° C.) | NO$_x$ removal % | NH$_3$ in exit gas (ppm) |
|---|---|---|---|---|---|---|---|---|---|---|---|---|
| | NO ppm | NO$_2$ ppm | SO$_2$ ppm | O$_2$ % | CO$_2$ % | H$_2$O % | Dust mg/m$^3$ | | | | | |
| 5 | 150 | 12 | 300 | 4 | 12 | 10 | 20 | 180 | 3000 | 200 | 82.5 | 46 |
| " | " | " | " | " | " | " | " | " | " | 250 | 95.0 | 18 |
| " | " | " | " | " | " | " | " | " | " | 300 | 99.0 | 5 |
| " | " | " | " | " | " | " | " | " | " | 350 | 99.5 | — |
| " | " | " | " | " | " | " | " | " | 7000 | 350 | 89.0 | 20 |
| " | " | " | " | " | " | " | " | 130 | 5000 | 350 | 80.0 | 2 |

Table 3

| Reaction temp. (° C.) | V/TiO$_2$ content (wt. %) | Comp. Ex. 2 | 6 | 5 | 7 | 8 | 9 |
|---|---|---|---|---|---|---|---|
| | | NO$_x$ removal (%) | | | | | |
| | | 0 | 0.30 | 0.68 | 1.4 | 3.4 | 5.0 |
| 200 | — | | 85.2 | 90.3 | 85.0 | 81.0 | 75.2 |
| 250 | 4.2 | | 93.1 | 97.2 | 93.0 | 90.5 | 87.1 |
| 300 | 8.0 | | 97.7 | 100 | 97.5 | 96.0 | 95.0 |
| 350 | 16.9 | | 100 | 100 | 100 | 99.3 | 99.0 |
| 400 | 23.5 | | 100 | 100 | 100 | 100 | 100 |

What is claimed is:

1. A process for preparing a catalyst for removal of nitrogen oxides which comprises impregnating a titanium oxide carrier with at least 0.1% by weight as vanadium atom based on the weight of said carrier of at least one vanadium compound selected for the group consisting of vanadium sulfates, vanadyl sulfates and a mixture thereof and then reacting a mixed gas consisting of 0.05 to 100% by mole of ammonia and 99.95 to 0% by mole of an inert gas which is substantially inert to both ammonia and vanadium and vanadyl sulfates with the impregnated carrier while the reaction mixture is maintained at a temperature of 300° to 520° C.

2. A process according to claim 1, wherein the reaction is carried out while the reaction mixture is maintained at a temperature of 370° to 450° C.

3. A process according to claim 1, wherein the titanium oxide carrier is impregnated with said vanadium compound in an amount of 0.1 to 5% by weight as vanadium atom based in the weight of said carrier.

4. A process according to claim 3, wherein the amount of said vanadium compound impregnated is 0.35 to 1.35% by weight as vanadium atom based on the weight of said carrier.

5. A process according to claim 1, wherein said vanadium compound is vanadyl sulfate (VOSO$_4$).

6. A process according to claim 1, wherein said vanadium compound is vanadium (II) sulfate (VSO$_4$).

7. A process according to claim 1, wherein said inert gas is nitrogen.

8. A catalyst for removal of nitrogen oxides prepared according to the process as defined in claim 1.

9. The catalyst of claim 8 which has a pore volume of 0.30–0.45 ml/g and a specific surface are of 20–50 m$^2$/g.

10. The catalyst of claim 8 wherein said catalyst is represented by at least one of the formulas:

$(TiO_2)_n VO$ or $(TiO_2)_n VO_2$.

11. A process for preparing a catalyst for removal of nitrogen oxides which comprises shaping a mixture of titanium oxide carrier and at least 0.1% by weight as vanadium atom based the weight of said carrier of at least one vanadium compound selected from the group consisting of vanadium sulfates, vanadyl sulfates and mixture thereof into a desired shape and then reacting a mixed gas consisting of 0.05 to 100% by mole of ammonia and 99.95 to 0% by mole of an inert gas which is substantially inert to both ammonia and vanadium and vanadyl sulfates with the shaped mixture while the reaction mixture is maintained at a temperature of 300° to 520°C.

12. A process according to claim 11, wherein the reaction is carried out while the reaction mixture is maintained at a temperature of 370° to 450° C.

13. A process according to claim 11, wherein the titanium oxide carrier is mixed with said vanadium compound in an amount of 0.1 to 5% by weight as vanadium atom based the weight of said carrier.

14. A process according to claim 13, wherein the amount of said vanadium compound mixed is 0.35 to 1.35% by weight as vanadium atom based in the weight of said carrier.

15. A process according to claim 11, wherein said vanadium compound is vanadyl sulfate ($VOSO_4$).

16. A process according to claim 11, wherein said vanadium compound is vanadium (II) sulfate ($VSO_4$).

17. A process according to claim 11, wherein said inert gas is nitrogen.

18. A catalyst for removal of nitrogen oxides prepared according to the process as defined in claim 11.

19. The catalyst of claim 18 which has a pore volume of 0.30–0.45 ml/g and a specific surface area of 20–50 m$^2$/g.

20. The catalyst of claim 18 wherein said catalyst is represented by at least one of the formulas:

$(TiO_2)_n VO$ or $(TiO_2)_n VO_2$.

* * * * *